United States Patent [19]

Keen

[11] Patent Number: 4,612,577

[45] Date of Patent: Sep. 16, 1986

[54] VIDEO SIGNAL PROCESSOR WITH SELECTIVE CLAMP

[75] Inventor: Ronald T. Keen, Marion County, Ind.

[73] Assignee: RCA Corporation, Princteon, N.J.

[21] Appl. No.: 748,758

[22] Filed: Jun. 26, 1985

[51] Int. Cl.[4] .............................................. H04N 5/18
[52] U.S. Cl. .................................... 358/172; 358/181
[58] Field of Search ............... 358/172, 171, 181, 903, 358/20; 324/104; 307/243

[56] References Cited

U.S. PATENT DOCUMENTS

| | | | |
|---|---|---|---|
| 4,263,610 | 4/1981 | Shanley et al. | 358/20 |
| 4,295,163 | 10/1981 | Hettiger | 358/20 X |
| 4,313,130 | 1/1982 | Yost | 358/172 X |
| 4,316,214 | 2/1982 | Yost | 358/172 X |

OTHER PUBLICATIONS

Technical specification pages for Mitsubishi M51322P RGB Interface Integrated Circuit.

Primary Examiner—James J. Groody
Assistant Examiner—E. Anne Toth
Attorney, Agent, or Firm—P. J. Rasmussen; P. M. Emanuel; R. H. Kurdyla

[57] ABSTRACT

A television receiver includes an interface network for selectively coupling either a standard broadcast television signal, or auxiliary analog or digital video signals, to an image display device. The interface network includes a keyed circuit for clamping the auxiliary signals. A pulse for keying the clamping circuit exhibits one timing characteristic when analog auxiliary signal are selected for display, and a different timing characteristic when a digital auxiliary signal is selected for display.

12 Claims, 8 Drawing Figures

VIDEO SIGNAL PROCESSOR WITH SELECTIVE CLAMP

This invention concerns a television receiver capable of displaying both video information derived from received broadcast television signals, as well as video information associated with auxiliary video signals. In particular, this invention concerns a signal clamping circuit compatible with standard and nonstandard types of auxiliary video signals.

Many television receivers and video monitors are capable of displaying auxiliary video information including alphanumeric character information such as may be provided by a computer terminal. To facilitate the display of auxiliary information, a receiver may include a switching interface network which selects one of two or more sets of video input signals, e.g., broadcast television signals or auxiliary computer derived video signals, for display by an image reproducing kinescope of the receiver. The interface network may include video signal processing circuits such as keyed clamps to establish a black image reference level for auxiliary video information to be displayed, in the same manner as clamps used to set the black level of normal television signals. A switching interface network of this type is the M51322P integrated circuit commercially available from the Mitsubishi Electric Co. of Hyoko, Japan.

Video signal clamping is normally performed during a portion of each horizontal line blanking interval, when video image information is blanked or inhibited, so that the video signal is clamped to black to establish a black reference level for image information being displayed. For this purpose a clamp keying pulse is usually generated during a so-called "back porch" interval of each horizontal line blanking interval associated with normal television signals developed according to NTSC broadcast television standards in the United States, for example.

It has been observed that auxiliary video signals from some computers exhibit horizontal blanking intervals of nonstandard duration depending upon the operating mode of the computer. For example, it has been observed that personal computer models "PC" and "XT" manufactured by International Business Machines (IBM) Corporation of Armonk, New York exhibit a standard horizontal blanking interval of approximately 11 microseconds duration when operating in a low resolution mode which produces approximately 40 image characters on a horizontal image line. However, these computer models exhibit a much shorter, nonstandard horizontal blanking interval of approximately 5.5 microseconds duration when operating in a high resolution mode which produces approximately 80 image characters on a horizontal image line.

A signal which is suitable for keying a clamp associated with standard television signals also produces proper results in the former case of low resolution auxiliary computer derived signals, but produces unacceptable results in the latter case of high resolution auxiliary computer derived signals with an associated nonstandard, shorter blanking interval. Specifically, in the latter case of a nonstandard blanking interval it has been observed that a standard clamp keying signal would appear shortly after the blanking interval ends, during the active image information interval which includes white image information. In this instance the clamp would be improperly keyed so as to clamp white image information to black. This unwanted effect is prevented from occurring by apparatus in accordance with the principles of the present invention, so that a source of clamp keying signals can be used with respect to auxiliary, e.g., computer derived, video signals having a nonstandard blanking interval, as well as with respect to video signals such as standard television signals having a standard blanking interval.

In a disclosed embodiment, apparatus according to the present invention is included in a video signal processing system including an interface network which receives a standard television signal, as well as auxiliary analog video signals and auxiliary digital video signals such as may be provided by a computer. The interface network includes a keyed clamping network for clamping the auxiliary signals, and selectively couples either the standard television signal or an auxiliary video signal to an image display device.

In accordance with the principles of the present invention, a keying pulse used to key a clamp for a digital auxiliary signal is displaced in time compared to a keying pulse used to key a clamp for a standard television signal. Thus, the time displaced keying pulse exhibits a nonstandard timing characteristic to accomodate a nonstandard blanking interval such as a shortened blanking interval which may be associated with some forms of digital signal information.

Figure 1:
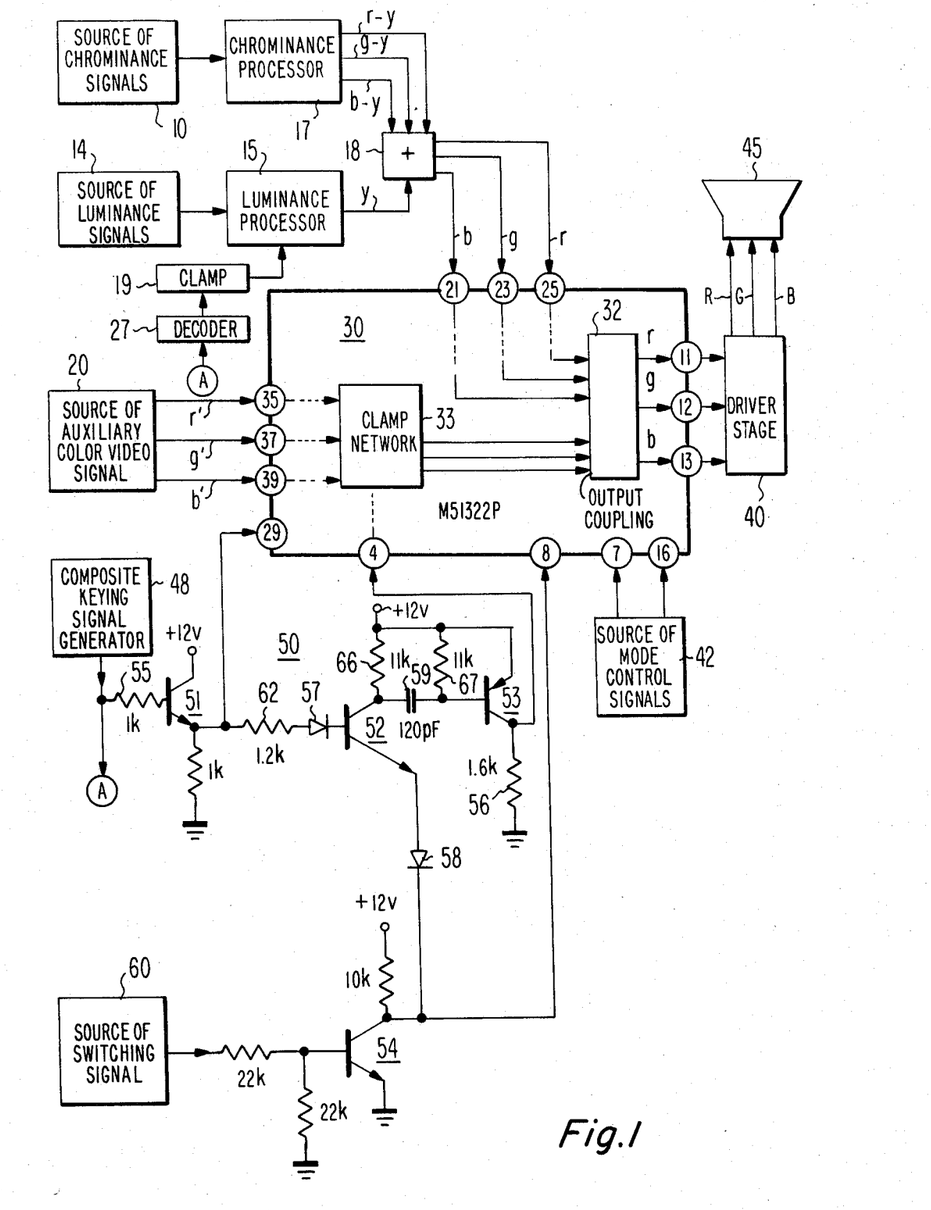
FIG. 1 shows a portion of a color television receiver, partly in block diagram form and partly in schematic circuit diagram form, including apparatus in accordance with the present invention.

In FIG. 1, a source of chrominance signals 10 derived from a standard broadcast composite color television signal (e.g., in accordance with NTSC television standards adopted in the United States) is processed by a chrominance signal processor 17 for developing color difference signals r-y, g-y and b-y in a known manner. A source of luminance signals 14 also derived from the composite color television signal is processed by a luminance signal processor 15. The color difference signals from processor 17 and the luminance signal from processor 15 are combined in a matrix amplifier 18 to produce output low level color image signals r, g and b. Auxiliary color image representative video signals r', g' and b' are provided from a source 20, which may be a video cassette recorder or video camera for providing auxiliary analog television signals in standard form, or a computer terminal for providing auxiliary digital video signals.

The standard r, g and b video signals from matrix 18 are respectively coupled to input terminals 25, 23 and 21 of a display interface switching network 30, such as the M51322P integrated circuit commercially available from Mitsubishi Electric Co. of Japan. Auxiliary video signals r', g' and b' from source 20 are respectively coupled to input terminals 35, 37 and 39 of network 30. Network 30 includes switching circuits (not shown) for selectively enabling either standard video signals r, g, b or auxiliary video signals r', g', b' to be applied to a display driver stage 40 via an output coupling network 32 and output terminals 11, 12 and 13. Either a standard or an auxiliary signal operating mode of network 30 is established by means of mode control signals applied to terminals 7 and 16 of network 30 from a source 42, e.g., including a viewer operated switching arrangement. The black reference level of auxiliary signals r', g' and b' is established by means of a keyed clamping network 33 included in network 30. Clamping network 33 responds to periodic keying pulses applied to a terminal 4 of network 30 as will be discussed subsequently. Display driver stage 40, e.g., comprising plural cascode video output amplifiers, provides high level amplified color signals R, G and B to intensity control electrodes of a color image displaying kinescope 45.

The receiver also includes a composite keying signal generator 48 which may be of the type described in U.S. Pat. No. 4,263,610 of R. L. Shanley, II, et al. for example. An output composite keying signal provided by signal generator 48 is illustrated in FIG. 2.

Figure 2:
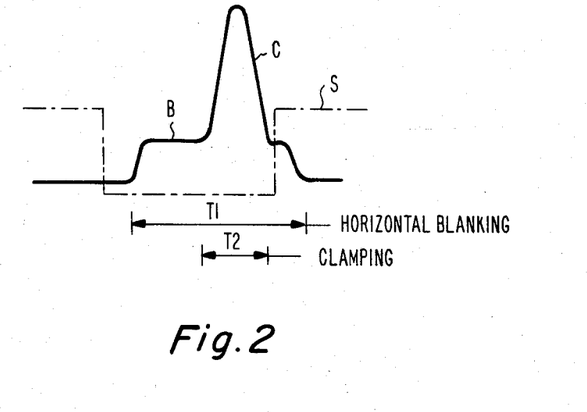
FIGS. 2-7 illustrate signal waveforms helpful in understanding the operation of the apparatus of FIG. 1.

In FIG. 2, the composite keying signal is delineated by a solid line. The composite keying signal, which is sometimes referred to as a "sandcastle" signal because of its configuration, includes a positive clamp keying pulse component C which occurs during a clamping interval T2 corresponding to a so-called "back porch" interval of each horizontal line blanking interval of a standard NTSC television signal. Keying pulse component C is superimposed on a blanking pulse component B of relatively greater duration T1, encompassing a horizontal retrace blanking interval. A composite keying signal of this type is desirable in a system wherein circuits to be keyed are included in an integrated circuit device, since only a single external keying signal input terminal of the integrated circuit is then required. The keying and blanking pulse components of the composite signal exhibit amplitudes and timing in accordance with standard keying and synchronizing requirements of signal processing circuits within the receiver, as explained in aforementioned U.S. Pat. No. 4,263,610 R. L. Shanley, et al. In this example the composite keying signal is arranged according to the configuration of standard NTSC broadcast television signals, as also discussed in the aforementioned U.S. patent.

FIG. 2 also illustrates a portion of an auxiliary digital video signal S from source 20, i.e, one of signals r', g' or b', such as may be provided by the IBM "PC" or "XT" model personal computers. Digital auxiliary signal S, e.g., a TTL signal, exhibits a low logic level (logic "0") over a digital signal blanking interval which includes clamping interval T2 and a substantial portion of blanking interval T1. Blanking interval T1 of the sandcastle signal is slightly delayed relative to the blanking interval of digital signal S due to signal transit delays experienced by the sandcastle signal. Such relative delay is often present in a receiver of the subject type having external auxiliary r, g, b direct signal inputs.

The illustrated form of digital auxiliary signal S is produced by the aforementioned IBM computer models when operating in a low resolution mode wherein approximately 40 image character are provided on a horizontal image line. In this case digital signal S is properly clamped to a desired black reference level in response to a clamp keying pulse applied to terminal 4 of network 30 in FIG. 1 during each horizontal blanking interval when keying pulse component C of the composite timing signal appears. The manner in which the clamp keying pulse applied to terminal 4 is derived from the composite timing signal will be explained subsequently.

Figure 3:
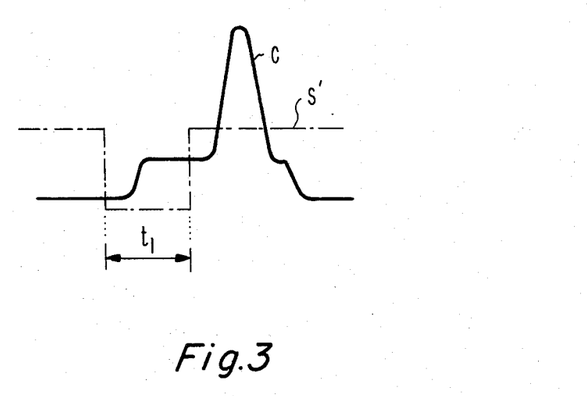

FIG. 3 also depicts the two types of signal waveforms of FIG. 2, except that digital auxiliary video signal S is shown as a digital signal S' with a much shorter, nonstandard image blanking interval $t_1$ compared to the blanking interval of signal S shown in FIG. 2. The fact that blanking interval $t_1$ of auxiliary signal S' is shorter than blanking interval $T_1$ of the sandcastle signal (FIG. 2) does not disrupt the display of character information, because the character display information occurs at a predetermined period of time after the end of standard blanking interval $T_1$.

The shortened blanking interval $t_1$ is produced by the aforementioned IBM computer models when operating in a high resolution mode providing approximately 80 image characters on a horizontal image line. In this case the shortened blanking interval of nonstandard digital signal S' is improperly timed with respect to the clamping interval when keying pulse component C appears. Specifically, in FIG. 3 clamp keying pulse C appears during a positive white-going image information portion of nonstandard video signal S'. This would result in improperly clamping white image information of signal S' to black, and is advantageously prevented by means of a signal translating circuit 50 including transistors 51, 52, 53 and 54 arranged as shown in FIG. 1. The translating circuit acts as a decoder for separating pulse component C from the remainder of the composite keying signal produced by signal generator 48.

In FIG. 1, a switching signal source 60, normally associated with the operation of interface network 30, operates in conjunction with signal translating circuit 50. A binary switching signal is normally coupled from source 60 via inverting transistor 54 to input terminal 8 of interface network 30, for the purpose of rendering circuits within interface network 30 compatible with the type of auxiliary signal (i.e., analog or digital) applied to input terminals 35, 37 and 39 from source 20. For processing an analog auxiliary signal, the switching signal from source 60 exhibits a low ("0") logic level so that a high logic level ("1") appears at terminal 8. The switching signal exhibits a high ("1") logic level when digital auxiliary signals are to be processed. The logic state of the switching signal is determined, for example, by the setting of a viewer controllable switch included in source 60.

The composite keying signal from source 48 is coupled via a terminal A to a decoder unit 27 which separates the keying pulse component (C in FIG. 2) from the composite keying signal. Terminal A may, for example, be an external terminal of a video processor integrated circuit including units 15, 17, 18, 19 and 27. The separated keying pulse is used to control the operation of a black level clamp which clamps the luminance signal processed by processor 15. The separated keying pulse as well as the separated blanking pulse component can be used to control the operation of other keyed circuits associated with processors 15 and 17 as explained in U.S. Pat. No. 4,263,610, which also discloses a circuit suitable for use as decoder 27.

The composite keying signal from source 48 is also coupled via a current limiting resistor 55 and emitter follower transistor 51 to blanking input terminal 29 of interface network 30. Circuits in network 30 respond to blanking pulse component B of the composite keying signal for blanking video signals processed by network 30 during horizontal image blanking intervals. The composite keying signal is also coupled via transistor 51, a current limiting resistor 62 and a level shifting diode 57 to inverting amplifier transistor 52. Collector bias for transistor 52 is provided by a resistor 66. A level shifting diode 58 is included in the emitter circuit of transistor 52.

Figure 4:
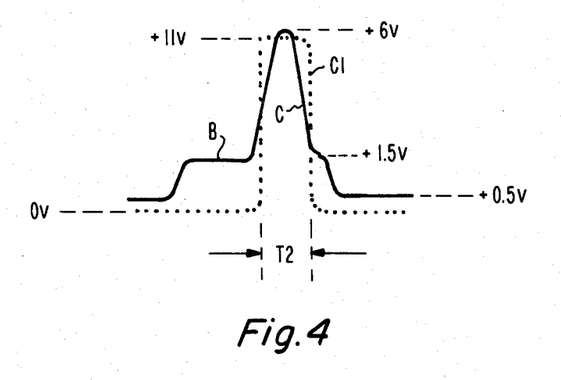

When analog auxiliary video signals from source 20 are to be processed by interface network 30 and coupled to driver stage 40, the switching signal from source 60 exhibits a low logic level and transistor 54 is rendered nonconductive. In this case a separated clamp keying pulse C1 with standard timing, as shown in FIG. 4, is derived from the composite keying signal and appears at the collector output of transistor 53. Collector bias for transistor 53 is provided by means of a resistor 56, which also assists to establish the signal gain of transistor 53. A resistor 67 provides base bias for transistor 53. Keying pulse C1 is aligned in time with pulse component C and occurs during standard clamping interval T2. In FIG. 4 the amplitudes of pulses C and C1 are given with respect to different amplitude scales.

Figure 5:
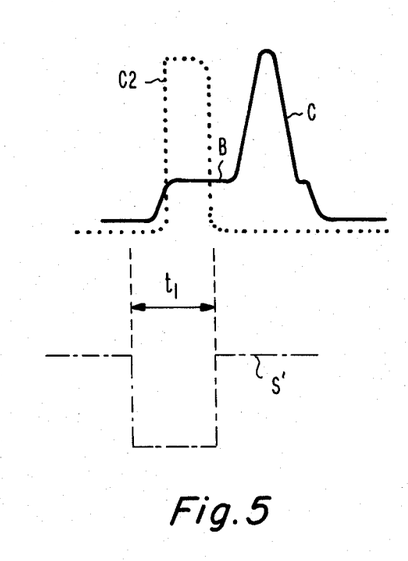

When digital auxiliary video signals from source 20 are to be processed by interface network 30, the switching signal from source 60 exhibits a high logic level for rendering transistor 54 conductive. In this case a separated clamp keying pulse C2, as shown in FIG. 5, is derived from the composite keying signal and appears at the collector of transistor 53. It is noted that keying pulse C2 differs from keying pulse C1 shown in FIG. 4 in that pulse C2 is displaced in time relative to pulse C1 and occurs earlier in time than pulse C1. Pulse C2 occurs within the standard horizontal blanking interval, but the timing of pulse C2 is such that it occurs during portion of a nonstandard shortened blanking interval $t_1$ which may be exhibited by some types of nonstandard auxiliary digital input signals as explained previously.

Thus in this example signal translating circuit 50 causes the separated clamp keying pulse component of the composite keying signal to be displaced in time so that it occurs earlier when digital auxiliary signals are to be processed. Clamp keying pulse C2 (FIG. 5) permits proper clamping of auxiliary digital signals even when they exhibit a standard (longer) horizontal blanking interval such as exhibited by digital signal S rather than a shortened blanking interval $t_1$ as exhibited by signal S'. Keying pulse C2 preferably should not be used with respect to analog auxiliary signals since such analog signals may include a synchronizing pulse component during the interval of time when keying pulse C2 is developed, and the presence of such synchronizing pulse is likely to disrupt the clamping function.

Translating circuit 50 develops keying pulses C1 and C2 as described below with reference to the waveforms of FIGS. 6 and 7.

Figure 6:
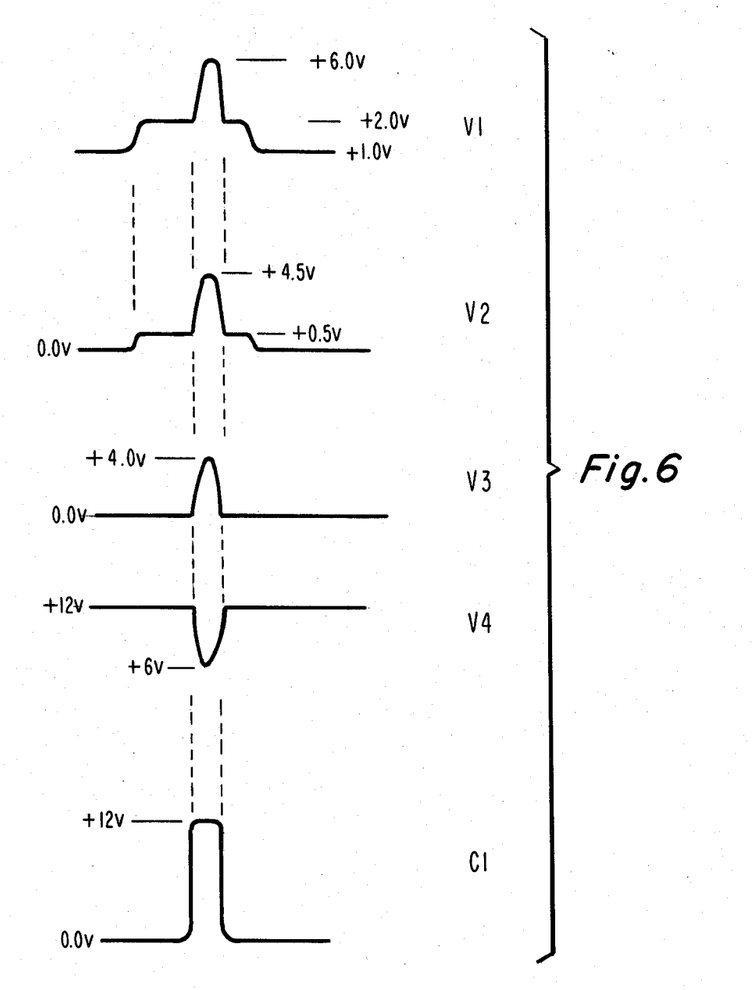

FIG. 6 depicts signal voltage waveforms associated with the operation of circuit 50 when transistor 54 is non-conductive, i.e., when an analog auxiliary signal is to be displayed. The sandcastle input signal voltage appearing at the emitter of transistor 51 is shown by waveform V1 in FIG. 6. Voltage waveform V2 depicts the sandcastle signal as it appears at the emitter of NPN transistor 52, level shifted relative to input signal V1 via the offset voltage drops across diode 57 and the base-emitter junction of transistor 52. Voltage waveform V3 shows the input signal as it appears at the cathode of diode 58, level shifted relative to signal waveform V2 by the offset voltage across diode 58. Waveform V3 is the keying pulse component of the sandcastle signal, and appears in inverted form at the collector of transistor 52 as indicated by voltage waveform V4. The amplitude of the pulse component of waveform V4 is a function of the ratio of the collector circuit impedance of transistor 52 to the emitter circuit impedance of transistor 52. Waveform C1, the clamp keying pulse discussed previously, is an amplified, inverted version of pulse waveform V4 as produced at the collector of high gain PNP amplifier transistor 53.

Figure 7:
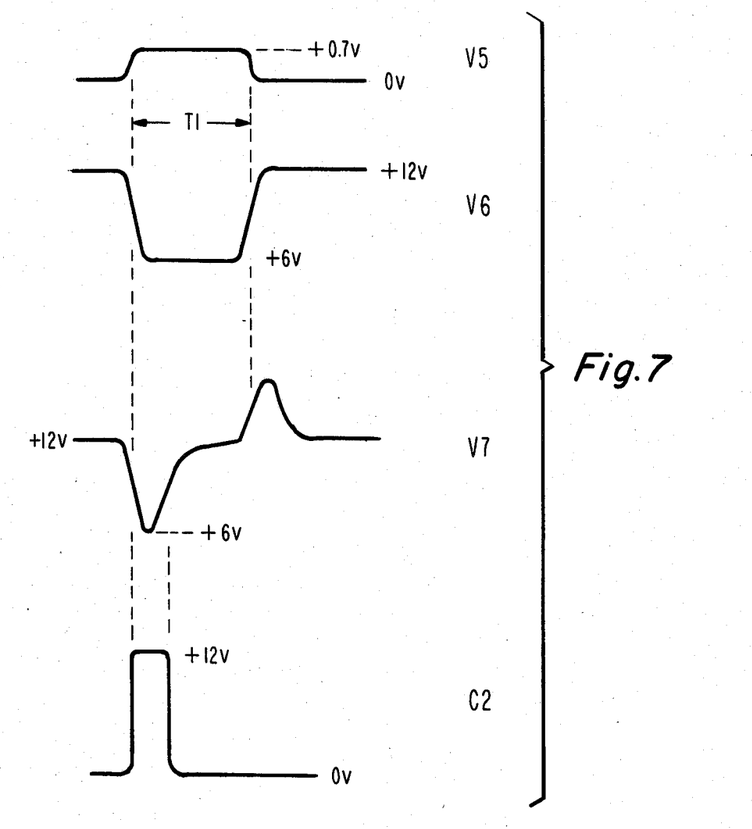

FIG. 7 depicts signal voltage waveforms associated with the operation of circuit 50 when transistor 54 is rendered conductive, i.e., when a digital auxiliary signal is to be displayed. The emitter circuit impedance of transistor 52 is reduced when transistor 54, e.g., a saturating switch, conducts, whereby the cathode of diode 58 is coupled to approximately ground potential via the collector-emitter path of transistor 54.

As shown by waveform V5 in FIG. 7, the input sandcastle signal developed at the emitter of transistor 52 results from the level shifting action of diode 57 and the base-emitter junction of transistor 52, and the clamping action of conductive diode 58. An inverted and amplified version of waveform V5 appears at the collector of transistor 52 as indicated by signal waveform V6. This signal after AC coupling via a capacitor 59 appears at the base input of high gain amplifier transistor 53 in the form of waveform V7. Waveform V7 results from the differentiation of waveform V6 by means of capacitor 59, resistor 67 and the equivalent base impedance of transistor 53. Waveform C2, corresponding to the time-shifted clamp keying pulse discussed previously, is an amplified and inverted version of waveform V7 as produced at the collector output of amplifier transistor 53. In this regard it is noted that only the negative-going amplitude portion of signal waveform V7, as associated with the leading (falling) edge of waveform V6, is amplified by transistor 53, since transistor 53 is rendered non-conductive by the positive-going amplitude portions of signal waveform V7 as associated with the lagging (rising) edge of waveform V6.

Separated keying pulses C1 and C2 advantageously exhibit steep slopes with fast edge transitions (rise and fall times). These pulses can therefore be used with various types of interface networks for causing associated clamp circuits to operate predictably for substantially the same length of time, even though such clamp circuits exhibit different switching threshold levels. The fast edge transitions of keying pulses C1 and C2 are due to the very high gain of output transistor 53, as determined by the ratio of the large collector impedance (primarily established by the value of resistor 56) to the small emitter impedance of transistor 53. It has been found that an effective gain of approximately 100 produces good results in this regard.

Figure 8:
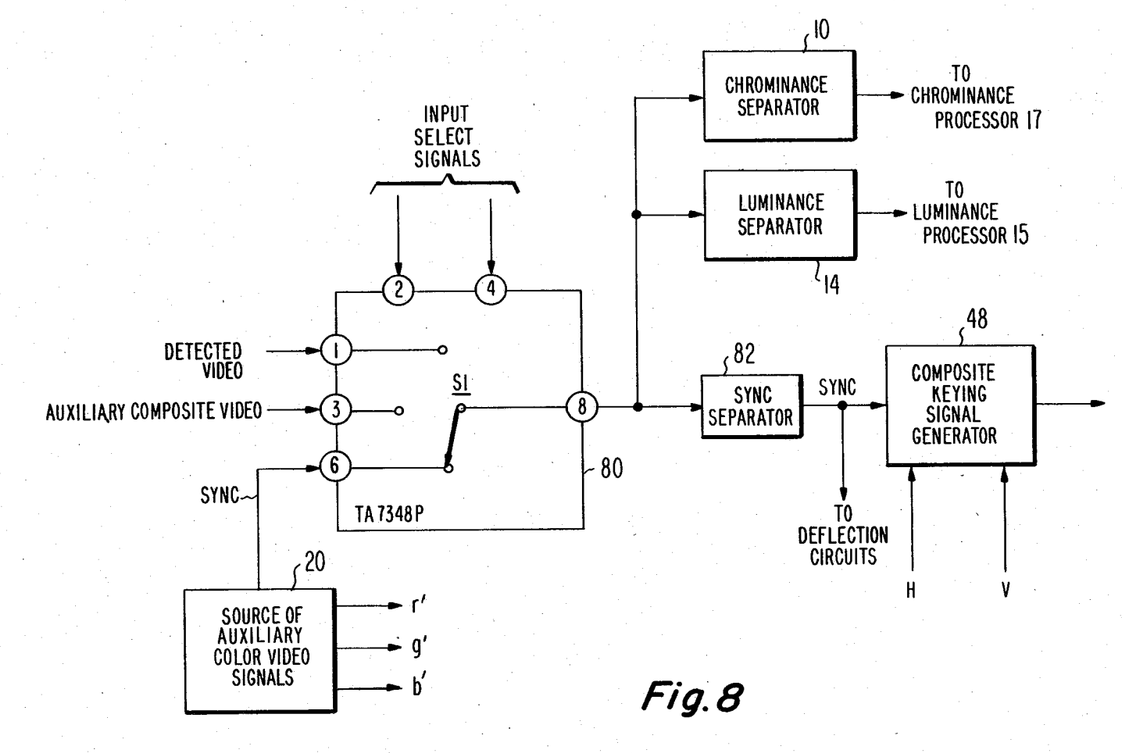
FIG. 8 shows additional details of the television receiver system of FIG. 1.

The output signal of composite keying signal generator 48 should be synchronized with respect to either the r, g, b color video signals or the r', g', b' auxiliary color video signals, depending upon which video signals are to be coupled to the display driver stage. FIG. 8 illustrates how such synchronization can be accomplished for the system of FIG. 1, wherein similar elements are identified by the same reference number.

In FIG. 8, a video signal switching network 80, such as the TA 7348P integrated circuit commercially available from Toshiba Corporation of Kawasaki, Japan, includes an electronic switch S1 for selectively coupling one of three video signal inputs from respective input terminals 1, 3 or 6 to an output terminal 8. In this example input terminal 1 receives a detected intermediate frequency (IF) signal from a video detector stage of the receiver, input terminal 3 receivers an auxiliary composite video signal such as from a video cassette recorder, and input terminal 6 receives a synchronizing (SYNC) signal provided by auxiliary color signal source 20. Input select logic control signals applied to terminals 2 and 4 of the TA 7348P integrated circuit determine which of the three input signals is selectively conveyed to output terminal 8. The input signal at terminal 1 is selected when the control signals applied to terminals 2 and 4 exhibit high and low logic levels, ie., logic "1" and logic "0" levels, respectively. The input signal at terminal 3 is selected when the control signals at terminals 2 and 4 exhibit low and high logic levels, respectively. The input signal at terminal 6 is selected when the control signals at terminals 2 and 4 both exhibit a low logic level. The control signals applied to terminals 2 and 4 may be derived from mode control signal source 42 shown in FIG. 1.

The detected video signal at input terminal 1 of network 80 is conveyed to output terminal 8 when the r, g, b color video signals associated with a standard broadcast composite color television signal are to be coupled to the display driver stage shown in FIG. 1. The luminance and chrominance components of the detected video signal are separated by means of frequency selective signal separation networks 10 and 14, which may comprise a comb filter for example. A sync separator network 82 separates the synchronizing component of the detected video signal. The separated synchronizing component (SYNC) is applied to keying signal generator 48, together with horizontal (H) and vertical (V) timing signals derived from deflection circuits of the receiver (not shown), as explained in aforementioned U.S. Pat. No. 4,263,610. The separated SYNC component is also applied to the deflection circuits for synchronizing the operation thereof.

The auxiliary SYNC signal at terminal 6 of network 80 is conveyed to output terminal 8 and to sync separator 82 when auxiliary video signals r', g' and b' are to be coupled to the display driver stage. In this case the SYNC output signal from network 82, as associated with the auxiliary video signals, is applied to keying signal generator 48 and to the deflection circuits of the receiver.

What is claimed is:

1. A video signal processing system including an image display device, said system comprising:
   a first input for receiving a first video signal having image and image blanking intervals;
   a second input for receiving an auxiliary second video signal having image and image blanking intervals;
   means for selectively coupling either said first video signal or said auxiliary video signal to said display device;
   means for providing a first keying signal;
   means responsive to said first keying signal for clamping said first video signal during blanking intervals thereof;
   means for providing a second keying signal; and
   means responsive to said second keying signal for clamping said auxiliary signal during blanking interval thereof; wherein
   said second keying signal is displaced in time relative to said first keying signal.

2. A system according to claim 1, wherein said auxiliary video signal is a digital video signal.

3. A system according to claim 2, wherein said first video signal is a television signal.

4. A system according to claim 3, wherein
   said blanking intervals of said first video signal and of said auxiliary second video signal are horizontal blanking intervals;
   said blanking interval of said auxiliary video signal exhibits a shorter duration than said blanking interval of said first video signal; and
   said second keying signal is developed prior to said first keying signal with reference to a given horizontal blanking interval.

5. In a television system including a video signal channel for processing a television signal having an image interval containing image information to be displayed, and an image blanking interval; an image display device responsive to video signals applied thereto; means for providing a first keying signal; and first keyed clamp means included in said video channel and responsive to said first keying signal for clamping said television signal during blanking intervals thereof; apparatus comprising:
   a first input for receiving said television signal;
   a second input for receiving an auxiliary video signal having an image interval containing information to be displayed, and an image blanking interval subject to exhibiting a different duration than the duration of said blanking interval of said television signal;
   means for selectively coupling either said television signal or said auxiliary video signal to said display device;
   means for providing a second keying signal; and
   second keyed means responsive to said second keying signal for clamping said auxiliary signal prior to being coupled to said display device; wherein
   said second keying signal is displaced in time relative to said first keying signal.

6. Apparatus according to claim 5, wherein said auxiliary signal is a digital video signal.

7. Apparatus according to claim 6, wherein
   said blanking interval of said television signal is a horizontal line blanking interval; and
   said blanking interval of said auxiliary video signal is a horizontal line blanking interval with a shorter duration than said blanking interval of said television signal.

8. Apparatus according to claim 5, wherein
   said second input is subject to receiving either an analog auxiliary video signal, or a digital auxiliary signal having an image blanking interval subject to exhibiting said different duration; and
   said second keying signal occurs during said blanking interval of said digital auxiliary signal.

9. Apparatus according to claim 5, wherein
   said second input is subject to receiving either an analog auxiliary video signal, or a digital auxiliary signal having an image blanking interval subject to exhibiting said different duration; and
   said second keying signal exhibits one timing characteristic when an analog auxiliary video signal is selected for display, and a different timing characteristic when a digital auxiliary video signal is selected for display.

10. Apparatus according to claim 5 including a source of timing signal having a keying component time coincident with said first keying signal, wherein:
    said means for providing said second timing signal comprises a signal translating circuit responsive to said timing signal, said translating circuit including input coupling means having an input for receiving said timing signal, and an output;

amplifier means having an input and an output; and means for differentiating signals from said output of said coupling means to said input of said amplifier means for developing said second keying signal at said output of said amplifier means.

11. Apparatus according to claim 10, wherein said differentiating means comprises means for AC coupling signals from said output of said coupling means to said input of said amplifier means.

12. Apparatus according to claim 10, wherein said input coupling means comprises a transistor of one conductivity type having a signal input base electrode, a signal output collector electrode, and a common emitter electrode; and said amplifier means comprises an amplifier transistor of an opposite conductivity type having a signal input base electrode, a signal output collector electrode, and a common emitter electrode.

* * * * *